US 6,721,023 B1

(12) United States Patent
Weiss et al.

(10) Patent No.: US 6,721,023 B1
(45) Date of Patent: Apr. 13, 2004

(54) MULTI-LAYERED, THREE-DIMENSIONAL DISPLAY

(75) Inventors: Victor Weiss, Rehovot (IL); Hanan Rumbak, Mazkeret Batya (IL)

(73) Assignee: ELOP Electro-Optics Industries Ltd., Rehovot (IL)

( * ) Notice: Subject to any disclaimer, the term of this patent is extended or adjusted under 35 U.S.C. 154(b) by 287 days.

(21) Appl. No.: 09/689,820

(22) Filed: Oct. 13, 2000

(30) Foreign Application Priority Data

Oct. 14, 1999 (IL) .................................................. 132400

(51) Int. Cl.[7] .................................................. G02F 1/13
(52) U.S. Cl. ........................................... 349/87; 349/88
(58) Field of Search ........................... 349/86, 87, 88, 349/89, 90, 91, 92, 93, 94

(56) References Cited

U.S. PATENT DOCUMENTS

| | | |
|---|---|---|
| 4,597,635 A | 7/1986 | Hoshikawa |
| 5,113,272 A | 5/1992 | Reamey |
| 5,208,686 A | 5/1993 | Fergason |
| 5,291,330 A | 3/1994 | Daniels |
| 5,689,316 A * | 11/1997 | Hattori et al. ................ 349/15 |
| 5,731,853 A * | 3/1998 | Taketomi et al. ............. 349/15 |
| 5,764,317 A * | 6/1998 | Sadovnik et al. ............. 349/1 |
| 5,864,375 A * | 1/1999 | Taketomi et al. ............. 349/15 |
| 6,014,187 A * | 1/2000 | Taketomi et al. ............. 349/15 |

* cited by examiner

*Primary Examiner*—James Dudek
(74) *Attorney, Agent, or Firm*—Connolly Bove Lodge & Hutz LLP

(57) ABSTRACT

The invention provides a multi-layered imaging device for three-dimensional image display, including a plurality of two-dimensional layers superposed in the third dimension, each of the layers having two major surfaces and at least one peripheral edge, the layers being made of a material selected from the group of non-conventional, polarizer-free liquid crystal materials including polymer-dispersed liquid crystals (PDLC) and derivatives and combinations thereof, wherein the exposure of at least one of the layers to illumination allows the transmission of light with minimal losses, facilitating utilization of a maximal number of layers for imaging a three-dimensional display.

13 Claims, 4 Drawing Sheets

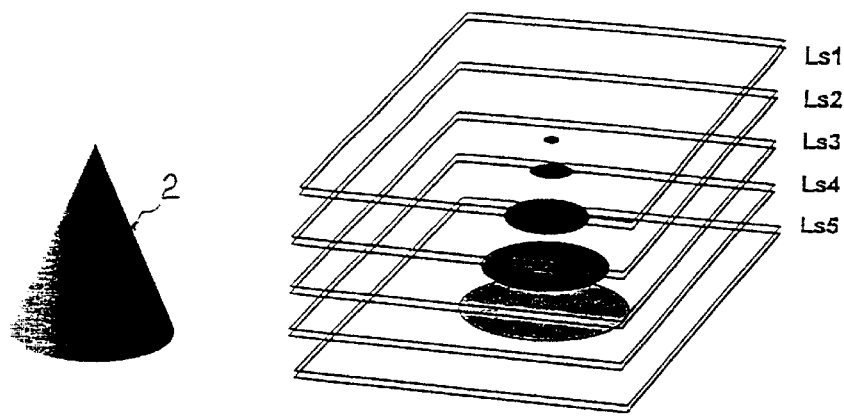
Fig. 1 (a)
Fig. 1 (b)
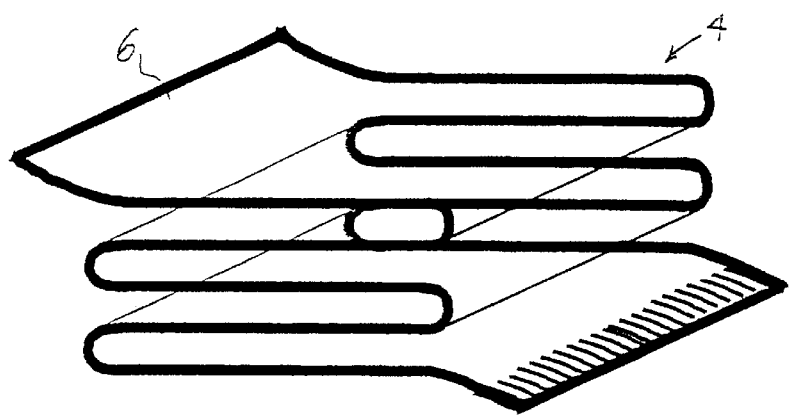
Fig. 2 (a)
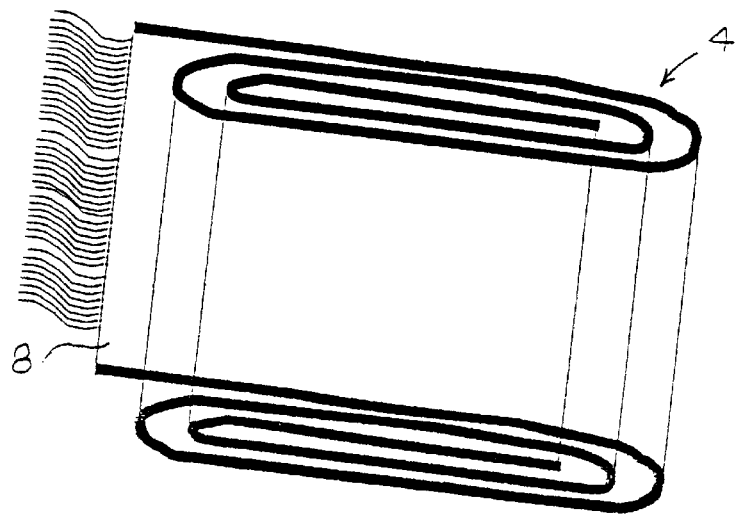
Fig. 2 (b)

MULTI-LAYERED, THREE-DIMENSIONAL DISPLAY

FIELD OF THE INVENTION

The present invention relates to electro-optic imaging devices for three-dimensional (3D) display applications. More particularly, the present invention concerns a method and apparatus for volumetric 3D displays utilizing stacked, multi-layered, two-dimensional (2D), flat panel technology, such as non-conventional LCD technology.

BACKGROUND OF THE INVENTION

With the continuously increasing demand for improved electronic imaging displays, and with the increasing bandwidth of computers, several 3D imaging display methods have been suggested, including stereovision, computer graphics, holography, vibrating or rotating screens, and split images, all of which have their advantages and drawbacks.

Stereovision has been increasingly developed in recent years; however, it is not a real 3D imaging method and therefore it has its limitations. Specifically, stereovision only takes into account binocular disparity (static parallax), but the other depth information, such as eye accommodation, convergence and motion parallax, are neglected. Another disadvantage is the need for viewing aids, such as eyeglasses and the like.

Computer graphics using 3D animation are also not real 3D. They give the impression of 3D information by shifting and/or rotating motion, and therefore, they have two basic drawbacks: first, a real, physiological 3D perception is not possible, and second, this method requires active intervention during perception, reducing attention and/or intervention for other actions.

Although conventional holography is a real depth 3D imaging method, it is not electronic, and it is therefore not a real-time display application. There are research and development programs on electronic holography at universities, but commercialization is so far not yet practical, due to the large space bandwidth requirements which at present necessitate the use of super computers.

Vibrating or rotating screen displays belong to another class of more recent, real depth imaging displays wherein a volume 3D image is created by lateral or rotational volume-sweeping of a 2D illuminated screen or disk. The disadvantage of this system obviously lies in the cumbersome opto-mechanical projection system.

Split image display refers to a relatively new method of 3D imaging, wherein an illusion of depth is created by projecting to the viewer's eye, via Fresnel lenses, two pseudoscopic images of two different focal lengths, i.e., a foreground image and a background image. The two different focal contents force the viewer to constantly refocus his eyes, thereby creating an eye accommodation and convergence effect. Static and motion parallax also exist with this method. The method does not utilize any mechanical volume sweeping, however, its drawback obviously lies in the limited detailed depth information available from specific objects. For example, an object in the foreground will have a 2D appearance, even though the overall image creates a 3D illusion.

In two different attempts to achieve real depth, or volumetric, 3D displays without referring to mechanical volume sweeping, the use of multi-layered, stacked 2D sliced images or image contours is proposed.

The first proposal teaches the stacking of two types of 2D panels: namely, gas discharge, or plasma, panels on the one hand, and liquid vapor devices on the other. One disadvantage of plasma displays obviously is associated with the production and handling of devices based on vacuum tube technology. Another disadvantage lies in the limited resolutions achievable with this technology.

The second proposal, as described in U.S. Pat. No. 5,745,197, teaches the use of stacked, planar, light-absorbing elements consisting of conventional LCD panels sandwiched between polarizers and quarter-wave plates. For practical reasons, LCD devices may be divided into three classes: (a) devices including conventional pairs of polarizers, (b) devices including one single polarizer, and (c) polarizer-free devices. The reason for this division lies in the fact that polarizers absorb an important part, over 50%, of the display illumination. Therefore, conventional LCD devices, as taught by said patent, are disadvantageous because of the necessity to introduce additional elements such as polarizers, which significantly reduce the brightness, and as a consequence the number of stacked layers, or depth, in a device. The reduced brightness necessitates increased lamp power, which in turn increases power consumption and heat dissipation.

Another disadvantage of utilizing conventional LCD technology is the limited viewing angle. To reduce this problem, additional optical compensation layers, such as quarter wave plates, may be introduced. Such additional compensation layers, however, further complicate the system and increase its cost.

Also, by limiting the image display operation principle of the LCD to absorption modulation (absorptive grey shades), an essential part of image perception based on light scattering is lost. In addition, the necessity to apply a rear backlight is disadvantageous, from both the aspect of the varying quantity of light arriving from different layers, which again limits the achievable depth of the scene or object to be displayed, and from the aspect of additional geometrical depth requirements of the display.

Other examples of possible flat-panel media that may be used for stacking in multi-layered display assemblies are:

1) inorganic or organic, electroluminescent light-emitting diode (OLED) layers;
2) electrochromic layers; and
3) non-linear, electro-optic layers.

The disadvantages of each of these media are: under (1), their permanent color and light-absorbing characteristics, which limit the number and depth of the layers; under (2), their slow response times, which make them impractical for real-time applications; and under (3), their need for high-intensity illumination, which implies expensive and/or bulky light sources.

SUMMARY OF THE INVENTION

The general object of the present invention is to provide methods of, and devices for, real-depth, volumetric 3D electro-optical image displays wherein the 3D images are achieved by utilizing multi-layered structures of electro-optical flat panel display technology, and wherein each of these layers represents a slice through the object to be displayed.

It is a specific object of the present invention to provide a multi-layered structure by stacking an assembly of layers on top of each other, utilizing at least two plastic substrates folded as many times as necessary to achieve the desired number of layers.

It is a further object of the present invention to utilize suitable 2D flat panel media of very high transmittance, having low absorbance, low reflectance or low scattering, in the areas where no image is displayed, so that the 3D image composed of said media does not become obscured in depth, to obtain good quality 3D images having good optical clarity. Advantageously, suitable 2D flat panel media are chosen from non-conventional, polarizer-free liquid crystal (LC) media, including polymer-dispersed liquid crystals (PDLC) and derivatives thereof, such as nematic curvilinear aligned phases (NCAP) and polymer stabilized cholesteric textures (PSCT) or guest-host (GH) dichroic or pleochroic LCs, and combinations and derivatives of these non-conventional media. Such media allow maximal light utilization because they minimize losses of polarizer and in-depth absorption, so as to allow larger depths and numbers of layers to be realized in 3D display devices.

Still another object of the present invention is to provide suitable illumination systems so as to make the image visible during operation of the 3D devices. Specifically, side-coupled illumination, in combination with scattering PDLC layers, enables homogeneous illumination of the object through its 3D depth, so as to allow larger depths and numbers of layers to be realized in 3D display devices.

A yet further object of the present invention addresses the attachment of suitable optical elements on top of a multi-layered imaging (MLI) stacked assembly for the purpose of 3D image and 3D depth enlargements (3D object scaling).

The present invention also provides electronic methods and systems for simultaneously driving and addressing the pixels of the 3D tensor (voxels).

In accordance with the present invention, there is therefore provided a multi-layered imaging device for three-dimensional image display, comprising a plurality of two-dimensional layers superposed in the third dimension, each of said layers having two major surfaces and at least one peripheral edge, said layers being made of a material selected from the group of non-conventional, polarizer-free liquid crystal materials including polymer-dispersed liquid crystals (PDLC) and derivatives and combinations thereof, wherein the exposure of at least one of said layers to illumination allows the transmission of light with minimal losses, facilitating utilization of a maximal number of layers for imaging a three-dimensional display.

Some of the intrinsic properties of the proposed 3D MLI devices of the present invention are unique, and include, among others, real-volume 3D image display, with theoretically possible maximal fields of view of 360°, both vertically and horizontally, and real-time, updateable and time-sequenced 3D image displays. These properties enable a large number of possible applications, each of which may exploit existing imaging capture systems. A non-exhaustive list of such imaging capture systems may include a set of cameras and sensors positioned in space, from which the spatial 3D information may be processed and distributed to the display layers; one or more cameras equipped with a laser or other range finder, so that the image data may be split by image depth and transferred to the individual display layers; and a set of radiation sources, precisely positioned in space, emitting collimated and confined beams which scan the object from which the transmitted, reflected or scattered data are collected by 2D sensor arrays and transferred to the individual image layers.

3D imaging of active (x-ray, MRI, etc.) and passive (radioactive emission) computer tomography seems to be a natural application of the present invention, because of the nature of the image acquisition, which is of a multi-layered nature. For example, in CT or MR imaging of the skull, the number of sliced images is a maximum of about 150 or 50, respectively, which are often reduced for economic reasons. Object reconstruction is computer time-intensive, involving very expensive workstations and programs. The present invention has great potential in reducing the time and cost of object reconstruction, because the sliced layer information may be directly fed into the 3D MLI.

Furthermore, as discussed above, the present invention enables real volume depth 3D image display, which is not possible with conventional display technology. Therefore, 3D MLI dramatically reduces the quantity of computer interaction, such as object rotation, etc., which is necessary with conventional displays in order to view the object from different angles and to produce 3D object information.

Additionally, 3D MLI techology enables actual four-dimensional (4D) display. In other words, a 3D object may be displayed as a time-dependent, 4D object. This is of great importance, as it allows temporal evolution of physiological changes in a patient to be monitored and imaged in 3D.

For any engineer, it is of importance in the designing phase to be able to demonstrate the designed object in a virtually real model. Therefore, 3D MLI is a most suitable application for modelling and prototyping of the present invention, because it is a real-depth 3D image display approach.

3D solid or computer graphic methods exist, each of which has its limitations. For example, the solid, layered photopolymer methods create a real solid model of the designed object. It takes several hours or days, however, until this solid model is available, and another identical time lapse if the model needs to be updated.

Furthermore, the present invention enables real-volume 3D image display, which is not possible with conventional computer graphics technology. Therefore, 3D MLI dramatically reduces the quantity of computer interaction, such as object rotation, etc., which is otherwise necessary in order to view the object from different angles so as to produce 3D object information.

As the 3D MLI technology is updateable in real-time, quite obviously it calls for 3D video and television applications. 3D television is of importance especially in such applications where 3D is an asset for producing enhanced depth perception or reality. A first example of such applications is aircraft navigation, where real-depth 3D images would assist the pilot during maneuvering or landing operations. A second example is 3D endoscopic displays in medicine, which, with the present invention, would become easier and more comfortable to use as no headgear devices are needed and consequently, may be simultaneously viewable to a large number of observers. A third example would be computer virtual reality and similar 3D television applications, which again would be easier and more comfortable, and viewable to an increased number of simultaneous viewers.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 1a and 1b are schematic representations of a cone-shaped object, imaged in layered segments according to the present invention;

FIGS. 2a and 2b are schematic representations of plastic substrates in folded form;

Figure 3:
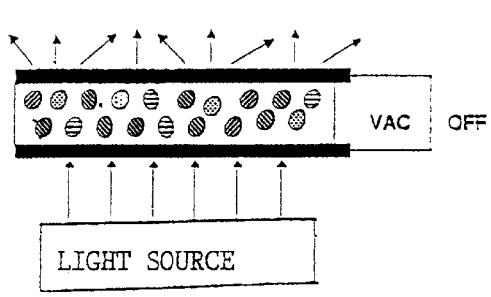
Figure 3:
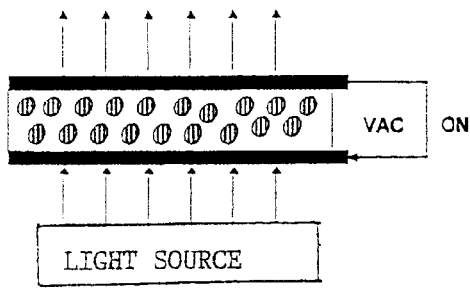
Figure 4:
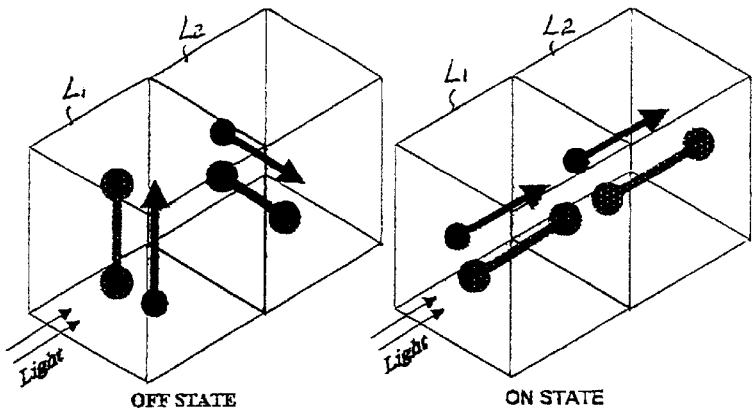
Figure 5:
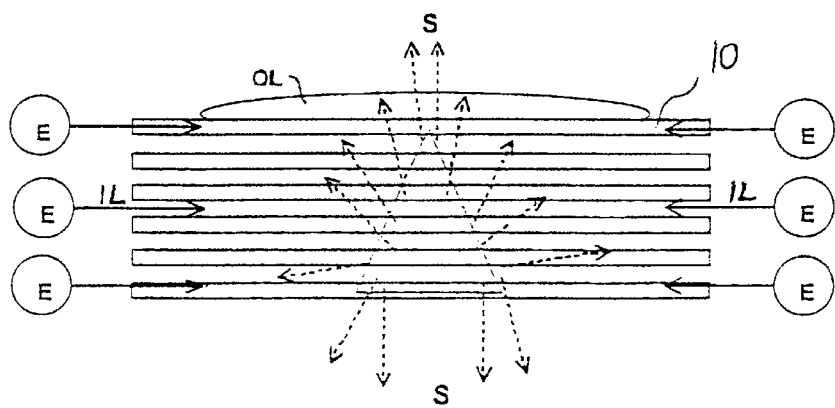
Figure 6:
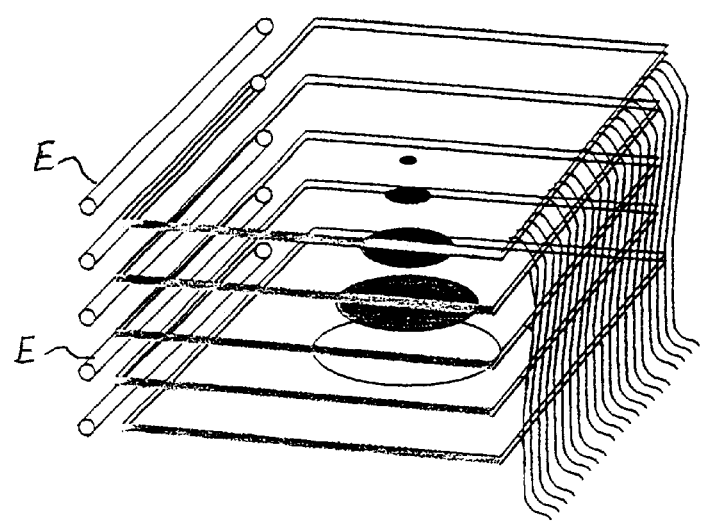
Figure 6:
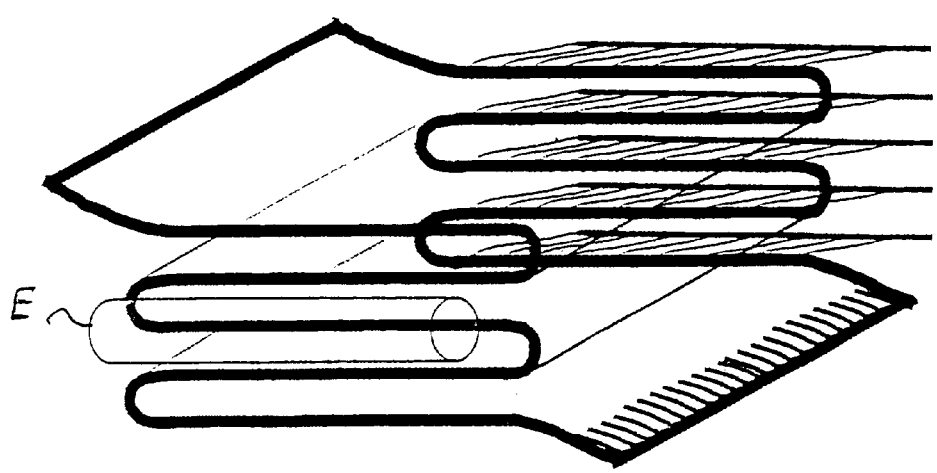
Figure 7:
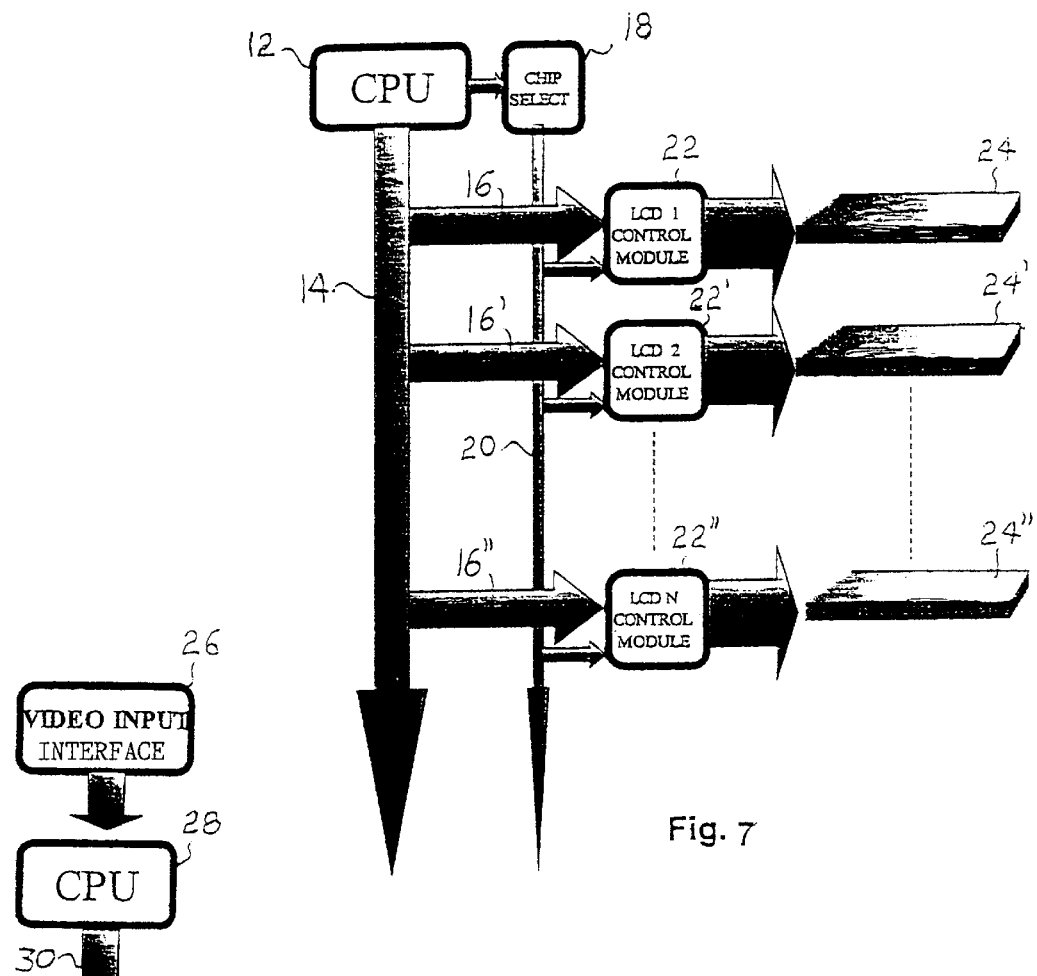
Figure 8:
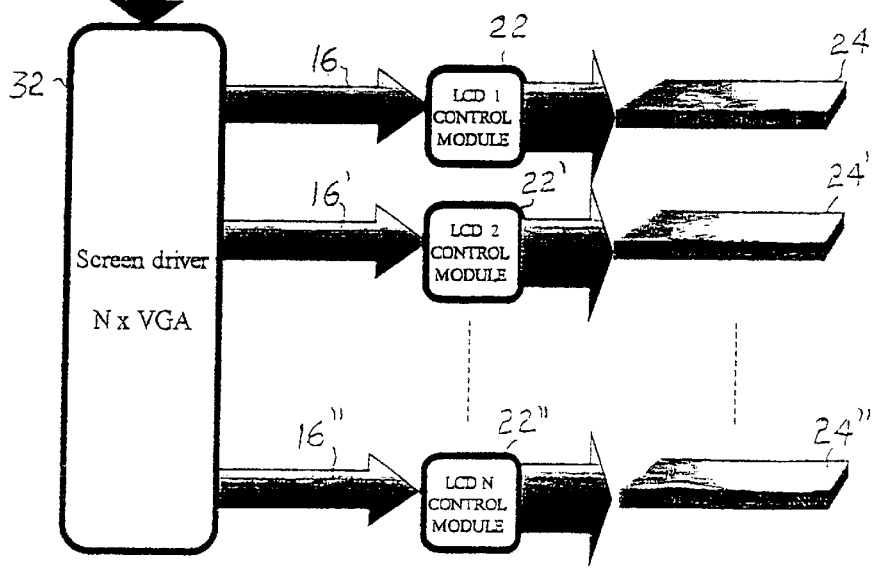

FIGS. 3a and 3b schematically illustrate principles of light-scattering through a material;

FIGS. 4a and 4b schematically illustrate an embodiment based on dichroic GH technology;

FIG. 5 schematically illustrates an illumination scheme for an edge-coupled light source;

FIGS. 6a and 6b illustrate the substrates of FIGS. 2a and 2b, respectively, as illuminated by light sources, and FIGS. 7 and 8 are block diagrams representing serial and parallel configurations, respectively, of driver systems for addressing individual layers of the MLI system according to the present invention.

DETAILED DESCRIPTION OF PREFERRED EMBODIMENTS

An example of a multi-layered structure (MLS) is schematically presented in FIGS. 1a and 1b. As shown, a solid cone object 2 is imaged by an MLS and includes layer segments $LS_1$, $LS_2$ . . . $LS_5$. The quality of the object reconstruction obviously depends on the available volume density of the layer segments.

The MLSs can be embodied in the following manner: by stacking cells made of glass or thick plastic substrates, one on top of the other, as schematically represented in FIG. 1b, the density of layers per volume being determined by choice of the substrate's thickness; or by exploiting the inherent flexibility of devices made of thin plastic substrates, as shown in FIGS. 2a and 2b.

In the latter case, the MLS consists of a single plastic substrate cell 4 of suitable dimensions, made of a folded-sheet structure, as schematically illustrated in FIG. 2a. Specifically, the illustrated plastic substrate cell is formed by a wound or folded sheet material 6. In the embodiment of FIG. 2b, the MLS consists of a single plastic substrate cell 4 of suitable dimensions, in this case made of a double spiral, cylindrical or elliptical roulade, wherein at least one pair of sheet material 8 of suitable dimensions is rolled into the required structure.

It should be emphasized that the above-mentioned stacking and folding methods are illustrative examples only, as several other methods can be easily derived and demonstrated.

The MLS stacking embodiments of FIGS. 2a and 2b, which involve thin plastic substrates, have to account for the fact that the layer spacing with such substrates is usually smaller than it is with glass substrates. If the layer density per volume has to be smaller than given by the substrate thickness, then an additional flexible spacer, for example, silicone rubber sheets, or a fixed volume fixture, for example, a periodically structured plastic body, has to be introduced.

Therefore, additional embodiments of the present invention include flexible plastic spacers or fixed volume fixtures such as a periodically structured plastic body, which are introduced into, and become an integral part of, the MLI structures.

The invention also relates to electro-optic flat panels, which are suitable for MLS assemblies. In order to achieve real-volume 3D images of good optical clarity, it is necessary to utilize 2D flat panel media of very high transmittance, having low absorbance or scattering, in the areas where no image is displayed, so that the 3D image does not become obscured in depth. Obviously, the flat panel media have to have real-time display capabilities so as to be addressable at high rates.

In order to achieve the high transmittance and real-time displays, non-conventional LCD technology is utilized. Therefore, conventional devices including pairs of polarizers are preferably not applied in the present invention, and consequently, an apparatus containing an MLS is achieved by stacking an assembly of non-conventional LC layers on top of each other, utilizing polarizer-free devices and thereby obtaining higher brightness.

Unconventional LCD technologies that are operated as polarizer-free devices, are based on physical principles. These principles are: (1) the light is variably scattered by randomly oriented LC phases such as LC droplets or LC microdomains embedded in polymer matrices; (2) the light is variably absorbed by dichroic or pleochroic dyes mixed into LC phases; and (3) the light is both variably scattered and variably absorbed by dichroic dye containing LC droplets or microdomains.

The present invention embodies the incorporation of cholesteric phases, polymer-dispersed LCs, and derivatives thereof, such as polymer-stabilized cholesteric textures (PSCT), nematic curvilinear aligned phases (NCAP), etc., operating according to principle (1) above. FIGS. 3a and 3b schematically depict principle (1) for normal mode cells. In the absence of an electric field, the LC molecules are randomly oriented within the LC microdroplet domains (PDLC or NCAP) or microdomain LC phases (PSCT), and consequently, there is a refractive index mismatch between these microdomains and the surrounding polymer matrix, causing light scattering (FIG. 3a). Upon application of an electric field, the LC molecules become aligned between themselves and among neighboring domains (homeotropic phase). Consequently, if suitable materials are chosen, the ordinary refractive index of the microdomains now matches that of the surrounding matrix, and as a result, light scattering vanishes and the panel becomes transparent (FIG. 3b).

For reverse-mode cells, in the absence of an electric field, the LC molecules are aligned in the homeotropic phase, perpendicular to the electrode surface, so that the cells are transparent. Only upon application of an electric field do the molecules take a random alignment, so that the cells become scattering.

Another embodiment of the present invention utilizing polarizer-free devices, incorporates GH dichroic LCDs using nematic phases (Heilmeier type) or cholesteric phases (White-Taylor type), and operates according to principle (2) above.

In these devices, dichroic dye guests are mixed into the LC phase hosts. Dichroic or pleochroic dyes have linear, stick-like molecules with large anisotropic absorbance, depending strongly on the incident light polarization. When such molecules are mixed within nematic LC phases, they orient themselves along the LC phase director and, as a result, exhibit switchable absorbance/transmittance variations. Devices utilizing these materials will be applied for the purpose of purely absorption-modulated images. For certain optional cases, image contrast can be gained by adding only one single polarizer on top of the display.

A significant image contrast enhancement may be achieved by exploiting the dichroic GH technology in a more sophisticated manner: Every 2D imaging layer will be composed of two sublayer cells $L_1$, $L_2$, which can be achieved by utilizing at least three substrates, preferably made of foldable and rollable flexible sheets. The two sublayer cells consist of two orthogonally oriented GH LC cells, as shown in FIGS. 4a and 4b. Specifically, each pixel in a 2D matrix is composed of two stacked GH cells, which function in principle as two dynamic cross polarizers. Shown are two representative molecules, one of type LC, represented by an arrow, and the other, of dichroic dye, represented by a dumbbell, for two possible switching orientations. For a normal mode operated cell, in the OFF state where no voltage is applied (FIG. 4a), the pixel is dark (absorptive) because it is in the nematic cross-polarized state. In the ON state, where voltage is applied (FIG. 4b), the pixel becomes bright (transparent), because it is switched into the homeotropic state and loses its polarizing characteristics. In MLI systems according to the present invention, the 2D double layer imaging matrices are stacked, folded or rolled in the third dimension.

Another embodiment of the present invention is the incorporation of GH dichroic PDLCs and their sub-classes, such as PSCT, NCAP, which enable devices operating according to principle (3) above. These devices have the capability to display image objects that are perceived by both absorption and scattering modulation, thereby enabling the display of the majority of objects. Furthermore, GH devices operating according to principle (3) have improved image display contrast properties, as compared to those operating only according to principle (1).

Dichroic dyes enable another important embodiment of 3D color displays. The individual voxels in the multi-layer stacked assembly consist of 4 sub-voxels per voxel, namely, a red, a green, a blue and a black sub-voxel for additive color rendition, or cyan, magenta, yellow and black sub-voxels for subtractive color rendition. The advantage of this technology, as compared to conventional LCD color technology, is the absence of permanent color filters, which would significantly absorb the light from other layers and thereby severely limit the depth and number of layers of the 3D display. According to the present invention, however, the color sub-voxels are individually switched on and off, thereby preventing any unwanted absorbance, such that a large depth and number of layers in 3D MLS are feasible. Furthermore, the GH devices operating according to principle (3) have improved color display contrast properties and, at the same time, possess high brightness.

In order to realize 3D MLI with flat panel display components which are non-light-emitting, such as the LCD technology, a suitable illumination scheme is required. Examples of such illumination schemes can be found with conventional, non-imaging or holographic backlighting arrangements.

Another example of illumination modes is made by edge-coupled light source E, as schematically illustrated in FIG. 5. It is especially well-suited to non-conventional LCD technology, operating according to the scattering display principle (1) and to the mixed absorbance and scattering display principle (3). Edge-coupled illumination devices 10 are attached to 3D MLI displays incorporating non-conventional LCD technology chosen from cholesteric phases, polymer-dispersed LCs (PDLCs), and their subclasses, such as PSCT, NCAP, etc., and/or their dichroic GH analogues, such as dichroic or pleochroic cholesterics or PDLCs. In such display systems, the edge-coupled light ray IL is scattered orthogonally to the viewer's eyes, as schematically indicated by the letter S.

As seen in FIG. 5, a plano-convex lens OL is mounted on top of the MLI. Such optics enables not only conventional image object scaling in the lateral 2D dimension, but also depth magnifying or scaling in the 3D dimension, thereby enabling true depth 3D object scaling. This optical/geometric configuration has an advantage in that the light directly illuminates every single layer in the MLI system, each layer not being obscured by other layers in the depth of the display, as illustrated in FIGS. 6a and 6b. Also, in this illumination system, the light is guided and projected to the viewer's eyes by so-called non-imaging optics. As such, unexpectedly, every layer in the 3D MLI assembly represents a 2D display panel having its own virtual non-imaging backlight built in, whereby the light is more efficiently utilized than it would be with conventional, back-illuminated displays.

Similar results are obtained for color display operation with GH PDLCs and their derivatives, in that color voxels are illuminated from the edge and then scattered in the direction of the viewer during their unaligned GLI orientation. With aligned GH phases, the voxels do not scatter any light; thus, permanent colored background or crosstalk is absent as well.

Another aspect of the present invention concerns addressing and driver electronics. MLS systems, which include a multitude of 2D pixel arrays stacked in the third dimension, have to be addressed. There are two possible driver configurations, derived from the specific needs of the display system in terms of time resolutions and the corresponding derived frame refresh rates. The first is a serial configuration, mainly applied in still imaging systems of slow frame refresh rates, as schematically shown in FIG. 7, and including the following components. The 3D data from the central processing unit (CPU) 12 is fed through the main CPU bus 14 to the individual layers in the MLI system through buses 16, 16', 16". The latter are synchronized by a chip-select switching system 18, connected through its appropriate chip-select bus 20 to the individual driver control modules 22, 22', 22". The control modules then drive the individual 2D pixel arrays of panels 24, 24', 24".

The second driver configuration is an inherently parallel addressing and driver system, which enables a 3D pixel tensor to be addressed in virtually the same time as its 2D parent matrix, thereby enabling fast addressing times and video frame refresh rates. An example of such a driver system is schematically depicted in FIG. 8. The video input 3D data is fed through the video interface 26 to the CPU 28. The processed data is then fed through the main CPU bus 30 to the special screen driver unit 32, from which it is distributed to the individual layers in the MLI system, addressing the individual pixels through the layer driver control modules.

In order to reduce the size and cost of the addressing driver system, several layers may be driven in parallel. If the overall number of layers in the 3D MLI system is N, and the number of layers per driver board is m, then the number of drivers Q for a particular 3D MLI system will be given by:

$$Q = N/m.$$

The number m will be a function of the number of pixels in each layer. In such reduced driver systems, similar to the above-described second driver configuration, an image acquisition system transfers the data to a CPU which prepares and transfers the data to the driver module, which then addresses and drives a group of individual panels and their voxels in parallel.

As some of these non-conventional LC phases are bistable, and as such, only change their properties upon applying a new signal pulse, display images can be either stored or displayed without constant image refresh, or either the CPU bandwidth and/or the addressing times can be further reduced and the image refresh rates increased. In such a system, the CPU determines which of the voxels need to be addressed and fed with new data, and which need not be addressed. Ast in most cases a rather reduced number of voxels have to be refreshed, this approach is useful in reducing either or both the CPU processing time and/or the addressing times, thereby increasing the refresh rates and/or the number of layers in the MLI system. Furthermore, as in many cases only the circumsphere (outer skin) of a 3D object has to be displayed, a further reduction in addressing times may be achieved by image information compression.

A modification of the present invention allows for important simplification of the driver system in conjunction with the above-described foldable plastic substrates and the resulting folded MLI structures. As schematically shown in FIG. 6b, significant reduction of drivers can be achieved because only one driver interface is needed for the Y-direction for all of the layers, which, of course, is not possible for rigid and separately stacked MLI structures (see FIG. 6a). In other words, the 3D voxel addressing tensor ($Y_{j/k}$, $X_{i/k}$, $Z_k$) is reduced to a virtual 2D addressing matrix ($Y_j$, $X_{i/k}$), at the expense of losing one degree of freedom in comparison to a fully parallel driver system. Therefore, this modification includes a flexible substrate folded 3D MLI structure system with 2D reduced-matrix driver systems.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A multi-layered imaging device for a real-volume depth three-dimensional image display, comprising:
   a plurality of two-dimensional spatial light display layers superposed in the third dimension, each of said layers having two major surfaces and at least one peripheral edge, said layers being made of a material selected from the group of non-conventional, polarizer-free liquid crystal materials including polymer-dispersed liquid crystals (PDLC) and derivatives and combinations thereof,
   means for selectively intrinsically illuminating each of said layers for forming an image of a three dimensional display.

2. The device as claimed in claim 1, wherein said derivatives are selected from the group of nematic curvilinear aligned phases (NCAP), polymer stabilized cholesteric textures (PSCT), guest-host (GH) dichroic or pleochroic LC's, or combinations thereof, such as GH dichroic PDLCs and their derivatives.

3. The device as claimed in claim 1, wherein said means for illuminating is disposed adjacent to a major surface of said at least one layer for illuminating said surface.

4. The device as claimed in claim 1, wherein said means for illuminating is disposed adjacent to at least one edge of said at least one layer.

5. The device as claimed in claim 1, wherein said layers are made of rigid or semi-rigid material.

6. The device as claimed in claim 1, wherein said layers are made of flexible material.

7. The device as claimed in claim 6, wherein said device is composed of at least one folded substrate layer cell.

8. The device as claimed in claim 6, wherein said device is composed of a rolled or spiral substrate layer cell.

9. The device as claimed in claim 6, further comprising a flexible spacer.

10. The device as claimed in claim 1, further comprising 3D depth-magnifying optics.

11. The device as claimed in claim 1, wherein said layers comprise at least three substrates having two stacked subpixel cells per layer.

12. The device as claimed in claim 11, wherein each of said subpixel cells comprises a dichroic or pleochroic GH LC, and said cells are oriented in mutually orthogonal directions.

13. The device as claimed in claim 1, wherein each layer is electronically connected to a computer controlled module for simultaneously driving same layer, thereby forming an image for a three-dimensional display.

* * * * *